(12) United States Patent
Thorne et al.

(10) Patent No.: US 12,243,413 B2
(45) Date of Patent: Mar. 4, 2025

(54) DOORBELL MOUNTING AND ACTIVATION APPARATUS AND METHOD

(71) Applicant: SimpliSafe, Inc., Boston, MA (US)

(72) Inventors: Scott Joseph Thorne, Allston, MA (US); Patrick Lloyd Murphy, Cambridge, MA (US); Michael Joseph Murray, West Roxbury, MA (US)

(73) Assignee: SimpliSafe, Inc., Boston, MA (US)

( * ) Notice: Subject to any disclaimer, the term of this patent is extended or adjusted under 35 U.S.C. 154(b) by 0 days.

(21) Appl. No.: 18/439,792

(22) Filed: Feb. 13, 2024

(65) Prior Publication Data

US 2024/0185692 A1    Jun. 6, 2024

Related U.S. Application Data

(63) Continuation of application No. 17/672,761, filed on Feb. 16, 2022, now Pat. No. 11,941,973.

(60) Provisional application No. 63/151,231, filed on Feb. 19, 2021.

(51) Int. Cl.
| | | |
|---|---|---|
| *G08B 3/02* | (2006.01) | |
| *F16M 11/00* | (2006.01) | |
| *F16M 13/00* | (2006.01) | |

(52) U.S. Cl.
CPC ............... *G08B 3/02* (2013.01); *F16M 11/00* (2013.01); *F16M 13/00* (2013.01)

(58) Field of Classification Search
CPC ........... F16M 11/00; F16M 13/00; G08B 3/02
See application file for complete search history.

(56) References Cited

U.S. PATENT DOCUMENTS

| | | | |
|---|---|---|---|
| 4,387,282 | A | 6/1983 | Latasiewicz |
| 5,952,926 | A | 9/1999 | Syverson |
| 6,094,139 | A | 7/2000 | Moore |
| 6,549,109 | B1 | 4/2003 | Yang |
| 6,828,519 | B2 | 12/2004 | Bui et al. |
| 7,714,243 | B2 | 5/2010 | Birdwell |
| 10,506,205 | B2 | 12/2019 | Siminoff et al. |
| 10,697,583 | B2 | 6/2020 | Law et al. |
| 10,761,408 | B2 | 9/2020 | Goulden et al. |
| 11,941,973 | B2 | 3/2024 | Thorne et al. |

(Continued)

FOREIGN PATENT DOCUMENTS

| | | |
|---|---|---|
| CN | 201044214 Y | 4/2008 |
| CN | 205405746 U | 7/2016 |

(Continued)

OTHER PUBLICATIONS

International Search Report and Written Opinion mailed May 25, 2022 for International Application No. PCT/US2022/016709.

(Continued)

*Primary Examiner* — Eret C McNichols (74) *Attorney, Agent, or Firm* — Wolf, Greenfield & Sacks, P.C.

(57) ABSTRACT

A doorbell including a housing and mount that can be engaged such that the housing is pivotable or otherwise movable relative to the mount for engagement with the mount and/or for activation of a doorbell switch. A latch can secure the housing to the mount so the housing is secured to the mount. A switch located in a space defined by the housing and mount can be actuated based on movement of the housing relative to the mount.

20 Claims, 4 Drawing Sheets

(56) References Cited

U.S. PATENT DOCUMENTS

| | | |
|---|---|---|
| 2002/0003479 A1 | 1/2002 | Vena |
| 2019/0043325 A1 | 2/2019 | Jeon |
| 2019/0219223 A1 | 7/2019 | Zhou |
| 2022/0270449 A1 | 8/2022 | Thorne et al. |

FOREIGN PATENT DOCUMENTS

| | | | |
|---|---|---|---|
| CN | 208141539 U | | 11/2018 |
| CN | 208351645 U | | 1/2019 |
| CN | 211509182 U | * | 9/2020 |
| CN | 216353873 U | | 4/2022 |
| EP | 0 879 452 B1 | | 3/2000 |

OTHER PUBLICATIONS

International Preliminary Report on Patentability mailed Aug. 31, 2023 for International Application No. PCT/US2022/016709.

* cited by examiner

DOORBELL MOUNTING AND ACTIVATION APPARATUS AND METHOD

RELATED APPLICATION

This application is a Continuation of U.S. application Ser. No. 17/672,761, filed Feb. 16, 2022, entitled "DOORBELL MOUNTING AND ACTIVATION APPARATUS AND METHOD", which claims priority under 35 U.S.C. § 119(e) to U.S. Provisional Application Ser. No. 63/151,231 filed on Feb. 19, 2021. The entire contents of these applications are incorporated herein by reference in their entirety.

TECHNICAL FIELD

This application relates to doorbells and other devices that have an activatable switch, e.g., by a user pressing on a button.

BACKGROUND

Doorbells are commonly used to monitor a location near a door or other entry into a building as well as allow a visitor to announce their presence. Such doorbells are often mounted to a wall or other surface near the entry point, e.g., in a place apparent to a visitor and convenient to interact with. In many cases, doorbells have a button or other switch that can be pressed by a visitor, which activates a chime or other indication to a person inside or otherwise monitoring the building entry.

SUMMARY OF INVENTION

In some aspects, a doorbell mounting and/or assembly configuration allows for easy installation and disassembly of the doorbell, e.g., for battery replacement or doorbell repair. In some examples, a fully-functional doorbell housing can be removably secured to a mount that is attached to a wall or other surface. The housing and mount can be arranged to allow the housing to be initially engaged to the mount, e.g., along a top edge of the housing and mount, to allow pivotal movement of the housing toward the mount. Initial engagement of the housing and mount can be relatively easily done, e.g., because only one side of the housing and mount need be aligned with each other. In some cases, hinge elements at the one side of the housing and mount can be engaged to permit pivotal movement of the housing relative to the mount. With the initial engagement complete, the housing can be pivoted relative to the mount to an engagement position, where a latch (e.g., at a bottom edge of the housing or mount) can secure the housing to the mount. The latch, which can include a slide element, can be engaged and/or disengaged by hand and/or using simple tools such as a standard screwdriver. In some examples, the housing and mount can have a temporary engagement feature whereby the housing can be supported by the mount before the latch is engaged. For example, a magnet and/or other engagement feature between the housing and mount can hold the housing on the mount before the latch is engaged. This can allow a user to temporarily hang the housing on the mount, freeing the user's hands for other activity, such as retrieving a tool, prior to engaging the latch. The housing can be easily removed from the mount, e.g., for battery replacement, by disengaging the latch and pivoting the housing away from the mount.

In some aspects, a doorbell configuration allows for the reduction in moving parts and/or elimination of moving parts such as a doorbell button on user-facing surfaces of the doorbell. As an example, a doorbell housing can be made movable as a single unit relative to a mount while the housing is secured to the mount. Movement of the housing relative to the mount can actuate a doorbell switch, which can be concealed or enclosed in a space between the housing and mount. As a result, the housing can have no moving parts, or at least no moving doorbell switch actuator, on outer surfaces that face a user. Instead, any moving part such as a doorbell switch can be located in a space between the housing and mount, and protected from contact by a user and/or environmental conditions. This arrangement can provide for improved protection of components inside of the housing, e.g., because seals at user-facing sides of the housing need not be provided for moving parts. Reduced moving parts on the housing can also reduce costs associated with manufacture and assembly.

In some examples, a doorbell includes a mount configured to be secured to a surface and support the doorbell on the surface. For example, the mount can be configured to be secured to a wall, door jamb or other surface, e.g., by fasteners. A housing can be configured to be secured to the mount such that the housing is movable relative to the mount between a rest position and an activation position. As an example, the housing can be secured to the mount so that the housing is not removable from the mount without intentionally disengaging the housing from the mount, and yet the housing is movable relative to the mount between the rest and activation positions. The housing can have a switch configured to be actuated to provide an indication of actuation of the doorbell in response to movement of the housing from the rest position to the activation position relative to the mount. As an example, the housing can be configured to be pressed or otherwise moved by a visitor, e.g., that presses on a front side of the housing, and movement of the housing relative to the mount can cause actuation of the switch. Actuation of the switch can cause various functions to be performed, such as actuation of a chime or other notification that the doorbell switch has been actuated, recording of audio and/or video by the doorbell (e.g., to allow a visitor to communicate with a remote user), and so on.

In some examples, the housing is configured to pivot or move linearly relative to the mount in movement from the rest position to the activation position. In some cases, the housing has a front side arranged to face a user that activates the doorbell and a rear side that faces the mount when the housing is secured to the mount. The doorbell switch can be located at the rear side of the housing, and can be contacted by the mount in response to the housing moving from the rest position to the activation position. Thus, movement of housing from the rest position to the activation position can cause the mount to contact and actuate the switch. In some examples, the switch is enclosed in a space defined by the housing and the mount when the housing is secured to the mount. This can help protect the switch from environmental conditions, such as moisture, and/or physical contact that could cause damage to the switch.

In some examples, a fulcrum or other pivot point is positioned between the mount and the housing and defines a pivot about which the housing moves between the rest position and the activation position. For example, the fulcrum can be defined by a portion of the housing such as a fin or rib that extends away from a rear side of the housing. In some cases, a biasing element is configured to provide a force on the housing to urge the housing to move to the rest position. For example, the biasing element can include a magnet that provides a magnetic force, e.g., an attractive force, between the housing and the mount. In some cases, the magnet can be positioned on a first side of the fulcrum or other pivot point between the housing and mount and the switch can be positioned on a second side of the fulcrum or pivot point opposite the first side. Movement of the housing against the magnetic force of the magnet toward the activation position can cause the mount to contact and actuate the switch.

In some examples, a doorbell includes a mount configured to be secured to a surface and support the doorbell on the surface and a housing configured to be secured to the mount. The housing can have a switch configured to be actuated to provide an indication of actuation of the doorbell. The mount and housing can have a first end and a second end opposite the first end and can be configured to engage with each other at the first end such that the housing is pivotable toward the mount about a pivot axis but is restricted in movement relative to the mount in directions parallel to the pivot axis and perpendicular to the pivot axis. For example, the pivot axis can be horizontally oriented, and the housing can be restricted in movement relative to the mount in directions along the horizontal axis and at least one direction perpendicular to the horizontal axis. A latch can be configured at a second end of the housing and the mount that is movable to engage the housing and mount at the second end so as to restrict movement of the housing about the pivot axis and the directions parallel and perpendicular to the pivot axis. This configuration can make the process of engaging the housing with the mount easier for a user, e.g., because the user can engage the housing and mount at a first end while the housing is arranged at an angle to the mount and then pivot the housing relative to the mount to a position where the latch can be engaged and secure the housing to the mount.

In some examples, a hinge at the first end of the mount and the housing can be configured to permit pivoting movement of the housing about the pivot axis and restrict movement of the housing in the directions parallel and perpendicular to the pivot axis. The latch can be mounted to the second end of the mount and be configured to engage with the housing at the second end. The hinge can be arranged to allow the housing to be engaged with the mount at the first end while the housing is at least partially positioned away from the mount at the second end and then allow pivoting of the housing to an engagement position. For example, in some cases, the housing has a rear surface, and the hinge can be configured to engage the housing and mount while the rear surface is positioned away from and at an angle relative to the mount. The hinge can be configured to permit pivotal movement of the housing about the pivot axis to position the rear surface of the housing adjacent the mount and allow engagement of the latch with the housing at the second end. In some cases, the mount includes a recess to receive the rear surface of the housing when the housing is positioned to engage with the latch.

In some examples, the hinge and the latch can be configured to allow the housing to pivot relative to the mount about a second pivot axis when the housing and mount are engaged by both the hinge and the latch. In some cases, the second pivot axis can be parallel to the pivot axis, e.g., be positioned between first and second ends of the housing and mount. Movement of the housing about the second pivot axis can cause the switch to be actuated, e.g., movement of the housing about the second pivot axis can cause the mount to contact and actuate the switch. The second pivot axis can be defined by a fulcrum or other pivot point between the housing and mount as described above.

In some examples, the hinge includes a tab at the first end of the mount (or housing) and a slot at the first end of the housing (or mount) to receive the tab. The tab and slot can be configured to permit pivoting movement of the housing about the pivot axis and restrict movement of the housing in the directions parallel and perpendicular to the pivot axis. As an example, the tab and slot can be configured to engage each other by moving the housing and mount relative to each other along a radial direction of the pivot axis. Engagement of the tab and slot can restrict movement of the housing and mount relative to each other in directions along the pivot axis and perpendicular to the radial direction along which the tab and slot are engaged.

In some cases, the hinge and latch can be configured to permit the housing to move relative to the mount between a rest position and an activation position while the housing and mount are engaged by the hinge and latch, and the switch can be configured to be actuated to provide an indication of actuation of the doorbell in response to movement of the housing from the rest position to the activation position. In some cases, the housing can pivot about the hinge pivot axis relative to the mount even when the latch is engaged. In some examples, a biasing element such as a spring or magnet can be configured to urge the housing to move to the rest position.

In some examples, a method of operating a doorbell includes providing a doorbell housing secured to a mount, and moving the housing relative to the mount between a rest position and an activation position to cause a switch of the housing to be actuated to provide an indication of actuation of the doorbell. For example, moving the housing can include pivoting of the housing relative to the mount from the rest position to the activation position. In some cases, moving the housing relative to the mount can include contacting a portion of the switch with a portion of the mount, e.g., to actuate the switch. In some examples, moving the housing includes moving the housing relative to the mount against a biasing force of a biasing element configured to move the housing to the rest position. For example, the biasing force can be a magnetic force that attracts the housing and the mount to move toward each other.

In some examples, a method of operating a doorbell includes providing a doorbell housing secured to a mount, engaging first ends of the housing and the mount such that the housing is pivotable toward the mount about a pivot axis but is restricted in movement relative to the mount in directions parallel to the pivot axis and perpendicular to the pivot axis, and engaging second ends of the housing and the mount with a latch so as to restrict movement of the housing about the pivot axis and the directions parallel and perpendicular to the pivot axis. In some cases, engaging the second ends includes engaging the housing and mount such that the housing is permitted to pivot relative to the mount within a range of movement. For example, the housing can be permitted to pivot relative to the mount about a second pivot axis different from the pivot axis. In some cases, the method includes pivoting the housing relative to the mount about the second pivot axis to actuate a switch of the doorbell. For example, the housing can be pivoted relative to the mount about the second pivot axis against a biasing force, such as a magnetic force that opposes pivoting of the housing relative to the mount to actuate the switch.

Other advantages and novel features will become apparent from the following detailed description of various nonlimiting examples when considered in conjunction with the accompanying figures and claims.

BRIEF DESCRIPTION OF THE DRAWINGS

Aspects of the systems and methods described herein are described with reference to the following drawings in which numerals reference like elements, and wherein.

DETAILED DESCRIPTION

Aspects of the systems and methods described herein are described below by way of one or more illustrative examples. It should be understood that the illustrative examples described are not intended to limit the aspects, but rather to help show how one or more aspects can be implemented in particular examples. Also, aspects can be implemented alone and/or in combination with other aspects. For example, some aspects below relate to a doorbell including a housing and mount that are separable and engagable with respect to each other using a latch, whereas other aspects relate to a doorbell having a housing that is movable relative to a mount to actuate a switch to provide an indication of actuation of the doorbell (e.g., to indicate a visitor has pressed a button on the housing). These aspects and others can be employed together, individually and/or in any suitable sub combination with each other, e.g., a housing and mount may be made inseparable from each other but allow the housing to move relative to the mount to actuate a switch, or a housing and mount may be engagable using a latch but in a way that does not permit movement of the housing relative to the mount when the latch is engaged.

In some aspects, a doorbell includes a mount configured to be secured to a surface and support the doorbell on the surface. For example, the mount can be arranged to be secured to a wall, door jamb or casing, window, or other surface using screws or other fasteners, adhesive, welding, etc. A housing of the doorbell can be attached to the mount and can include one or more components to provide doorbell functions. For example, the housing can have a switch configured to be actuated to provide an indication of actuation of the doorbell, such as by a user pressing a button or other portion of the housing to actuate the switch. The indication of doorbell actuation can be used to perform various functions, such as activating an audible and/or visual chime or other indication that the doorbell switch has been actuated. In some examples the doorbell housing can include other components, such as a camera or other imaging device to image an area near the doorbell, a motion sensor to detect motion near the doorbell, a speaker for producing audible sound, a microphone for receiving and transmitting a signal indicative of sound at or around the doorbell, wireless and/or wired communications devices for sending and receiving signals regarding sensed conditions at the doorbell, a controller to generate control signals for the doorbell or other devices, a user interface to receive and present information to a user (e.g., visually and/or audibly) by the doorbell, a battery or other power source, and so on. Thus, with the housing secured to the mount on a wall or other surface, the doorbell housing can perform various functions suitable for a doorbell, such as allowing a visitor to announce presence at a building door or other access area, allowing a user to communicate audibly and/or visually with a visitor via a camera/display/speaker/microphone, allowing a user to monitor activity in an area near the doorbell (via recorded sound and/or video), and so on.

In some aspects, the doorbell housing can be engaged with the mount in a user-friendly and/or secure way that reduces the likelihood that the housing will be separated from the mount, whether accidentally or intentionally. In some examples, the housing can be securely attached to the mount without the use of tools or with a simple general purpose tool such as a standard screwdriver. In some examples, the housing can be secured to the mount by a movable latch that locks the housing in place relative to the mount. In some cases, the housing can be aligned and positioned with respect to the mount by engaging elements of a hinge between the housing and mount while the housing is positioned away from the mount and then pivoting the housing to an engagement position relative to the mount, e.g., in which the latch can engage the housing and mount. For example, the mount and housing can be configured to engage with each other at an upper end of the housing and mount such that the housing is pivotable toward the mount about a pivot axis but is restricted in movement relative to the mount in directions parallel to the pivot axis and perpendicular to the pivot axis. With the upper ends of the mount and housing engaged with each other, e.g., by a hinge, the housing can be pivoted toward the mount toward an engagement position. When at the engagement position, a latch on the housing or mount can be moved to engage the housing and mount together. The engagement of the latch can limit movement of the housing in directions along the pivot axis and in directions perpendicular to the pivot axis, as well as rotation about the pivot axis. In some cases, the housing and mount can include a temporary engagement feature that holds the housing stationary and supports the housing on the mount before the latch is engaged. This can allow a user to release the housing before the latch is engaged without concern that the housing will disengage from the mount. With the housing self-supported on the mount, a user can manipulate the latch to engage the housing more permanently with the mount. In some cases, a magnet can be used to exert an attractive force between the housing and mount to temporarily hold the housing on the mount. To more permanently engage the housing and mount, a user can move a latch to engage the mount and housing with each other, e.g., at a lower end of the mount and housing.

Figure 1:
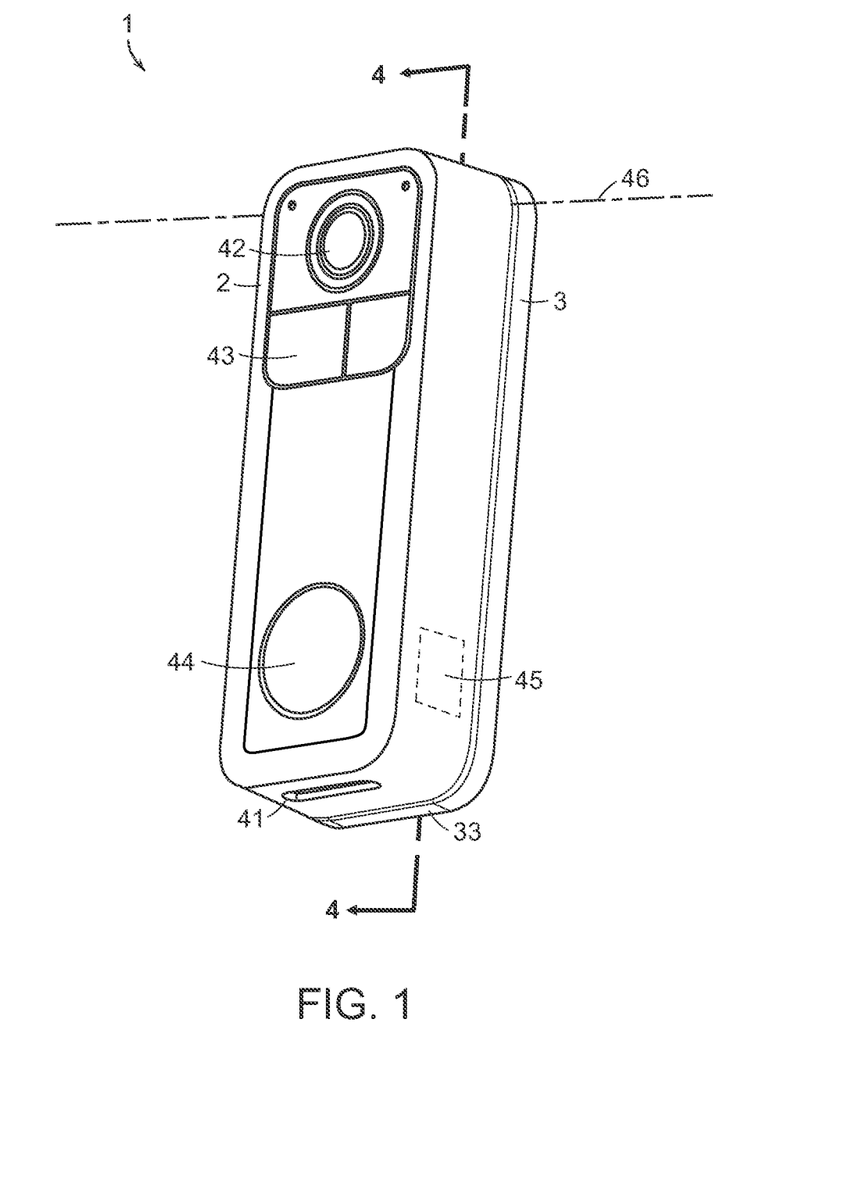
FIG. 1 is front lower right perspective view of a doorbell in an illustrative example.

FIG. 1 shows an illustrative example of a doorbell 1 that includes a housing 2 and a mount 3. In some examples, the housing 2 can include components for performing functions for the doorbell 1, such as a microphone and speaker 41, a camera or other imaging device 42, a motion sensor 43, a button or press area 44 that a visitor can press to cause an indication that the doorbell switch has been actuated, and so on. Operation of such components can be controlled by a controller 45, which can include a computer or other data processing unit configured to perform various functions such as causing the camera 42 to capture video and/or still image data, the microphone and speaker 41 to record and/or present audible sound, communicate with devices remote from the doorbell 1 (such as a user phone or other device to allow a user to observe and communicate with a visitor), actuate a chime or other device to indicate that a user has pressed the button 44, store sensed condition data such as sound, video, motion, etc., a battery or other power source for the doorbell 1, and other functions. These and/or other components can be housed at least partially within the housing 2, e.g., such that the doorbell 1 can perform all, most or many of its functions whether attached to the mount 3 or not. In some examples, the housing 2 can be configured to perform all of its functions without being engaged with the mount 3, except for actuating a switch to indicate that the doorbell switch or button has been activated. In some examples, the doorbell 1 is configured to operate completely wirelessly (e.g., without wires for electrical power and/or communication). In some examples, the doorbell 1 can be wired for power and/or communication, e.g., to actuate a doorbell chime inside of a building.

Figure 2:
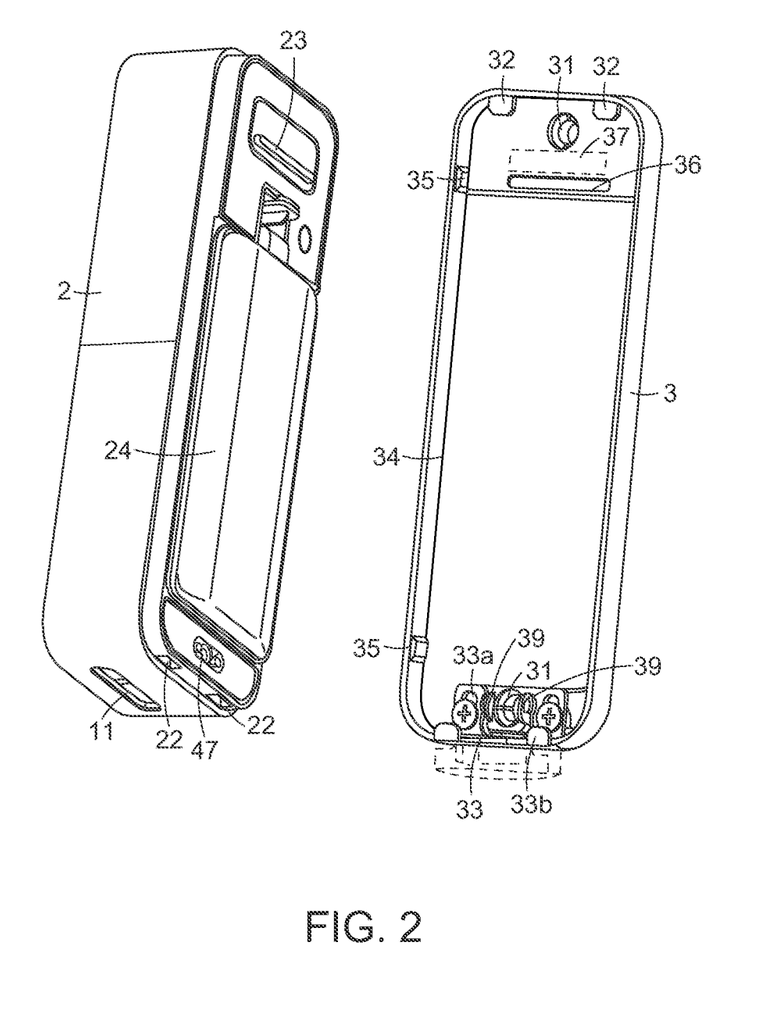
FIG. 2 is an exploded view of the FIG. 1 doorbell in disassembled form.

In some examples, the mount 3 can be configured to be secured to a wall or other surface and so support the housing 2 on the wall or other surface. For example, FIG. 2 shows the housing 2 detached from the mount 3 and shows a front side of the mount 3 that is positioned adjacent the rear side of the housing 2 when the housing 2 is engaged with the mount 3. The mount 3 can include openings 31 or other features to allow a screw or other fastener to secure the mount 3 to a wall or other surface. Other arrangements can be employed to secure the mount 3 to a surface, such as adhesive, welding, magnets, etc. FIG. 2 also shows that the rear side of the housing 2 can have various components exposed, such as a battery door that can be removed for replacement of a battery in the housing 2.

In some examples, the housing 2 and mount 3 are configured to engage with each other at a first end, such as an upper end, so that a portion of the housing 2 (e.g., a portion of the housing containing or defining the button 4) is pivotable toward and away from the mount 3 about a pivot axis 46. In some examples, the housing 2 and mount 3 are configured to engage at the first end so as to permit pivotal movement of the housing 2 about the pivot axis 46 but the housing 2 is restricted in movement relative to the mount 3 in directions parallel to the pivot axis 46 and perpendicular to the pivot axis (e.g., perpendicular to a plane of a rear side of the housing 2). For example, the housing 2 and mount 3 can have hinge elements that engage with each other so the upper ends of the housing 2 and mount 3 are engaged and the lower ends of the housing 2 and mount 3 are positioned away from each other in a first position. The hinge elements can allow the housing 2 to be pivoted about the pivot axis 46 to a second position so that the lower ends of the housing and mount 3 are positioned adjacent each other, e.g., so that the rear side of the housing 2 is adjacent the front side of the mount 3. With the housing 2 in the second position, a latch 33 can be operated to engage the lower ends of the housing 2 and mount 3 with each other. When the lower ends of the housing 2 and mount 3 are engaged by the latch, the housing 2 can be restricted or limited in movement about the pivot axis 46 away from the second position, e.g., the housing 2 can be restricted in movement in directions parallel and perpendicular to the pivot axis 46 as well as restricted in pivotal movement about the pivot axis 46. This can secure the housing 2 to the mount 3 so the housing 2 cannot be removed without the latch 33 being first disengaged.

Figure 3:
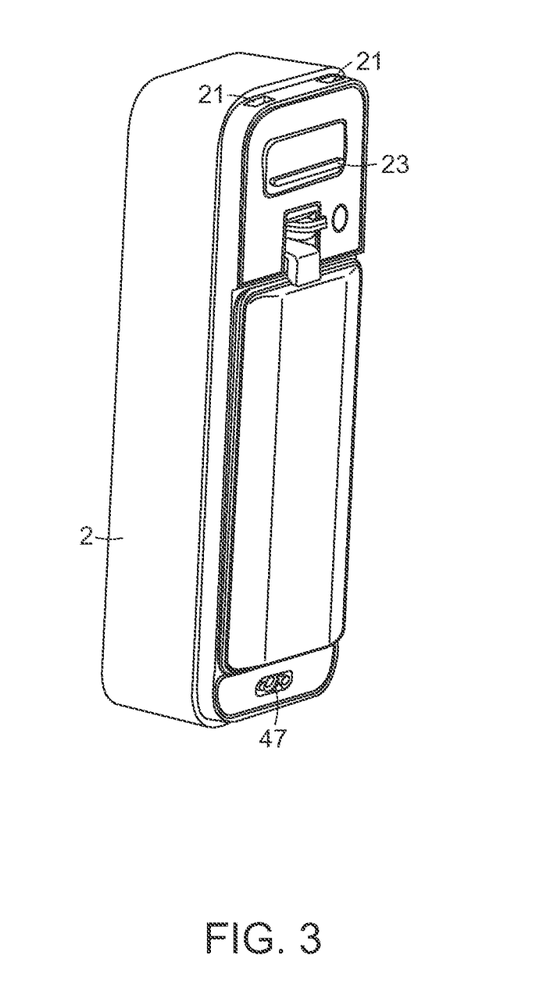
FIG. 3 is a rear perspective view of the FIG. 1 doorbell housing removed from the mount.
Figure 4:
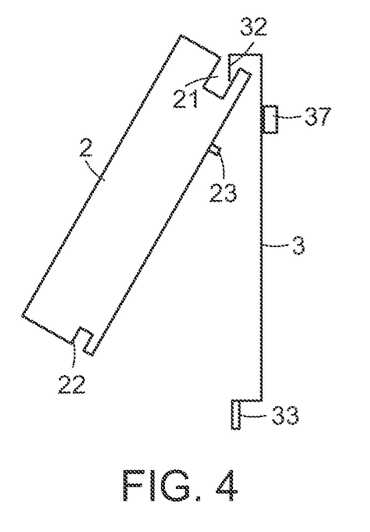
FIG. 4 is a schematic section view of the FIG. 1 doorbell along the lines 4-4 in FIG. 1 with the rear side of the housing positioned away from the mount.
Figure 5:
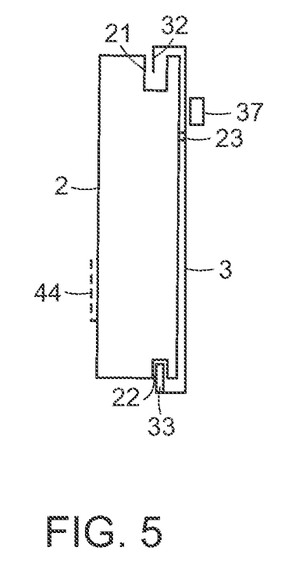
FIG. 5 is a schematic section view of the FIG. 1 doorbell along the lines 4-4 in FIG. 1.

As an example, FIG. 2 shows the housing 2 and mount 3 separated from each other and depicting a rear side of the housing 2 and a front side of the mount 3. The mount 3 includes tabs 32 at an upper side of the mount 3 that are configured to engage with corresponding slots 21 at an upper side of the housing 2, which can be seen in FIG. 3. The tabs 32 and slots 21 form a hinge connection between the housing 2 and the mount 3 that allows the upper ends of the housing 2 and mount 3 to be engaged while the rear side of the housing 2 is positioned away from and at an angle to the mount 3. This arrangement is shown schematically in FIG. 4 where the tabs 32 and slots 21 are engaged and the rear side of the housing 2 is positioned away from and at an angle to the mount 3. The tabs 32 and slots 21 can be engaged by inserting the tabs 32 into the slots 21 in a radial direction relative to the pivot axis 46. Engagement of the tabs 32 and slots 21 permits movement of the housing 2 about the pivot axis 46 (see FIG. 1), but restricts movement of the housing 2 relative to the mount 3 in directions along the pivot axis 46 (e.g., left to right or laterally when viewing the housing 2 from the front) and in directions perpendicular to the pivot axis (e.g., in directions perpendicular to the rear side of the housing 2 and/or perpendicular to the radial direction in which the tabs 32 and slots 21 are engaged). Engagement of the tabs 32 and slots 21 can be performed by a user manipulating the housing 2 so that the tabs 32 are inserted into the slots 21. With the tabs 32 and slots 21 engaged, the housing 2 can be pivoted about the pivot axis 46 so that the rear side of the housing 2 is moved adjacent to the mount 3 and the lower ends of the housing 2 and mount 3 are positioned adjacent each other as shown in FIG. 5. The housing 2 can be secured to the mount 3 by moving a latch 33 so that tabs 33b or other features of the latch 33 engage with corresponding slots 22 (see FIG. 2) at the lower side of the housing 2. Engagement of the latch 33 can secure the housing 2 to the mount 3 so that the housing 2 is restricted or limited in movement about the pivot axis 46 as well as in directions along and perpendicular to the pivot axis 46. In some examples, the housing 2 can be further restricted or limited in movement and/or positioned in a desired way relative to the mount 3 by receiving the rear side of the housing 2 into a recess 34 of the housing. The recess 34 can be defined by a peripheral wall of the mount 3, which can carry the tabs 32 and/or alignment features 35 that can contact the housing 2 to position the housing 2 as desired in the recess 34. In some examples, a portion of the rear side of the housing 2 can be received into the recess 34 or otherwise engaged with the mount 3 so that the housing 2 is movable to at least a limited extent relative to the mount 3, e.g., to move in and out of the recess 34 and/or pivot about the pivot axis 46 or another parallel axis relative to the mount 3. That is, the latch 33 and/or hinge engagement between the housing 2 and mount 3 can secure the housing 2 to the mount 3 so it cannot be removed while still provide at least some, though limited, movement of the housing 2 relative to the mount 3.

In some examples, the latch 33 can be configured as an element that is slidably mounted to the mount 3. For example, FIG. 2 illustrates an example in which the latch 33 is arranged as a hook-shaped or J-shaped component having a pair of openings 33a formed along a long leg of the J-shape that each receive a fastener (e.g., a screw) to attach the latch 33 to the mount 3 so that the latch 33 can slide up and down relative to the mount 3. FIG. 2 shows the latch 33 in an upward most position and the latch 33 can be moved downwardly from the FIG. 2 position (e.g., as shown in dashed line in FIG. 2 and schematically in FIG. 4) so that the lower end of the housing 2 can be received into the recess 34 without interference from the latch 33. Shorter legs of the J-shaped element include tabs 33b that are configured to engage with corresponding slots 22 at the lower end of the housing 2. It should be understood, however, that the latch 33 can be configured in other ways in some examples. For example, the latch 33 can be mounted to the housing 2 rather than the mount 3 and configured to engage with corresponding slots or other openings formed on the mount 3. In some examples, the latch 33 is manually operable, e.g., a user can move the latch 33 between engaged and disengaged positions. In some cases, a simple tool such as a standard screwdriver can be used to disengage the latch 33, although a tool need not be required to engage the latch 33. In some examples, the latch 33 can be spring loaded or otherwise biased to move to either to the engaged or disengaged position, e.g., similar to how typical building door latches are spring loaded to automatically engage the door and door jamb when the door is closed. For example, the latch 33 can be biased to move to the engaged position and arranged so that the latch 33 automatically engages with the housing 2 by pressing the housing 2 into the engagement position on the mount 3. In the illustrated example the latch 33 is at a lower end of the housing 2 and mount 3, but the latch 33 can be positioned in other locations in some examples, e.g., at an upper end and/or at sides of the housing 2 and mount 3. In some examples, a latch 33 can be provided in two or more locations, e.g., at upper and lower ends of the housing 2 and mount 3. In some examples, the latch 33 includes a detent that retains the latch 33 in the engaged and/or disengaged position. For example, a detent that retains the latch 33 in the engaged position can help ensure that the latch 33 does not disengage from the housing 2 unless a user intentionally moves the latch 33.

A hinge engagement between the housing 2 and mount 3 can be arranged in other ways than that shown in FIGS. 2-5, and in some examples can be eliminated entirely. For example, in some examples, the housing 2 can carry tabs or other male features that engage with slots or other corresponding female features on the mount 3. In some examples, the housing 2 and/or mount 3 can include hinge knuckles that engage with each other by a hinge pin. In some examples, the hinge can include hooks that are formed on the housing 2 and/or mount 3 that engage with a corresponding feature on the mount 3 and/or housing 2. The hinge can be provided in other locations than at an upper end of the housing 2 and mount 3, e.g., at a lateral side and/or lower end of the housing 2 and mount 3 in some examples. A hinge engagement between the housing 2 and mount 3 need not be provided at all and can be replaced with an engagement that does not provide for pivotal movement of the housing 2 relative to the mount 3.

In some aspects, the mount and housing can be configured such that the housing is movable relative to the mount while or after the housing is secured to the mount. Such relative movement can permit actuation of a switch or other component to provide an indication of actuation of the doorbell. For example, the housing can have a switch and the housing can be configured to move between a rest position and an activation position relative to the mount while the housing is secured to the mount. The switch can be configured to be actuated to provide an indication of actuation of the doorbell in response to movement of the housing from the rest position to the activation position, e.g., in response to a user pressing on a front side of the housing. In some examples, the housing can pivot relative to the mount in movement from the rest position to the activation position. In some cases, the housing can move along a linear path relative to the mount between the rest position and the activation position.

In the illustrative example of FIGS. 1-5, the housing 2 is configured to pivot or otherwise move relative to the mount 3 even while the housing 2 is engaged to the mount 3, e.g., by the latch 33. This movement of the housing 2 can actuate a switch 47 to provide an indication of actuation of the doorbell, e.g., by a user indicating arrival at a door or other entry to a building. In some examples, movement of the housing 2 relative to the mount 3 to actuate the switch 47 can be about a second pivot axis that is defined by a pivot point which is separate or distinct from the hinge connection between the housing 2 and mount 3. In some examples, the housing 2 can include a fulcrum 23 positioned between the mount 3 and the housing 2 and which defines a pivot about which the housing 2 moves between the rest position and the activation position. In some examples, the fulcrum 23 is defined by a portion of the housing 2 that extends away from a rear side of the housing 2, e.g., in a location between the upper and lower ends of the housing 2. The fulcrum 23 can be configured as a rib, fin, pin, standoff, ball element, etc. that extends from a rear side of the housing 2, and the fulcrum 23 can be received in a groove 36 of the mount 3 or otherwise contact a portion of the mount 3. In some examples, the fulcrum 23 can define a second pivot axis about which the housing 2 can pivot relative to the mount 3 and which is parallel to the pivot axis 46. That is, the housing 2 can be configured to pivot relative to the mount 3 about the pivot axis 46 to engage the housing 2 and mount 3 with each other, and once the housing 2 and mount 3 are engaged, the housing 2 can be pivotally movable relative to the mount 3 about a second pivot axis defined by the fulcrum 23. Pivotal movement of the housing 2 about the second pivot axis can cause actuation of a switch 47, e.g., located at the rear side of the housing 2. For example, a visitor pressing on the press area 44 at the front side of the housing 2 can cause the housing 2 to pivot about the second pivot axis defined by the fulcrum 23 so the lower ends of the housing 2 and mount 3 move towards each other, e.g., to move toward the activation position. This can cause a portion of the mount 3 (such as a pair of teeth 39 on the mount 3) to actuate the switch 47, which actuation can be detected by the controller 45 and cause the controller 45 to actuate a chime or otherwise provide an indication to a user that the doorbell 1 has been actuated, cause the controller 45 to record audio/video data at the doorbell location, provide instructions to the visitor, etc. In some examples, movement of the housing 2 to the activation position can cause a portion of the mount 3 to physically contact and move a portion of the switch 47 to actuate the switch 47. In some examples, the switch 47 can be actuated in non-contact ways, such as by a magnet on the mount 3 actuating a Hall effect or other switch 47 on the housing 2. In some examples, the switch 47 can be enclosed in a space defined by the housing 2 and the mount 3 when the housing is secured to the mount. This can help protect the switch 47 from environmental conditions, such as undesired physical contact which may cause damage, water or other moisture, etc., and can help protect the switch 47 from high actuation forces. For example, when the housing 2 is moved to the activation position, a stop on the housing 2 can contact the mount 3 so that further movement of the housing 2 toward the mount 3 is prevented. This can limit the force or physical travel of the switch 47 when it is actuated, protecting the switch 47 from damage. Providing the switch 47 at a rear side of the housing 2 can also eliminate any moving parts on a front side of the housing 2, e.g., eliminate a button with a movable element that is pressed by a user to actuate the doorbell. This can help eliminate components that can fail, e.g., due to excessive activation forces and/or environmental conditions, at the front side of the housing 2.

In some examples, the doorbell can include a biasing element configured to provide a force on the housing to urge the housing to move to the rest position, i.e., to urge the housing to move away from the activation position relative to the mount. In some examples, the biasing element can include a spring or other resilient element that is positioned between the housing 2 and mount 3 and urges the housing 2 to move to the rest position. Such a resilient element can be positioned between the rear side of the housing 2 and the front side of the mount 3, e.g., between the fulcrum 23 and the lower ends of the housing 2 and mount 3. In some examples, the biasing element can include a magnet 37 that is configured to exert a force on the housing 2 to urge the housing to move to the rest position. In some cases, use of a non-contacting biasing element such as a magnet can provide improved reliability and/or reduced manufacturing costs, e.g., because a biasing element can be molded with one or more component and eliminate any need to assemble separate parts together. For example, FIGS. 2, 4 and 5 illustrate a magnet 37 that is attached to the mount 3 and positioned to exert an attractive force to move the housing 2 and mount 3 toward each other at a location between the fulcrum 23 (or second pivot point) and the upper ends of the housing 2 and mount 3. This attractive force can cause the housing 2 to pivot in a clockwise direction about the fulcrum 23 (as viewed in FIGS. 4 and 5) and toward the rest position. A visitor that presses on the press area 44 of the housing 2 (which is positioned between the fulcrum 23 or second pivot point and the lower ends of the housing 2 and mount 3) can overcome the biasing force of the magnet 37 and cause the housing 2 to pivot in a counterclockwise direction to the activation position. As discussed above, movement of the housing 2 to the activation position can actuate the switch 47, e.g., by causing a part of the mount 3 to contact and move a portion of the switch 47. The magnet 37 can be configured in other ways in other examples. In some examples, the magnet 37 can be mounted to the housing 2 to provide an attractive force between the housing 2 and mount 3. In some examples, the magnet 37 can be configured to exert a repulsive force between the housing 2 and mount 3, e.g., the magnet 37 can be positioned between the fulcrum 23 or second pivot point and the lower ends of the housing 2 and mount 3 and urge the housing 2 to move away from the mount 3 to the rest position.

In some examples, a pivot point and/or biasing element between the housing 2 and mount 3 can provide a temporary engagement between the housing 2 and mount 3 before the latch 33 or other securing member is engaged. This feature can allow a user to more easily engage the housing 2 with the mount 3, particularly when the user must manually operate the latch 33 to engage the housing 2 and mount 3. In some examples, a fulcrum 23 or other pivot point and/or a magnet 37 or other biasing element can temporarily secure the housing 2 to the mount 3, e.g., so that the user can release the housing 2 and yet the housing 2 is supported on the mount 3 by the pivot point and/or biasing element. For example, the fulcrum 23 can engage with the groove 36 and/or the magnet 37 can provide an attractive force between the housing 2 and the mount 3 so that the housing 2 can be supported on the mount 3 without the latch 33 engaged. The fulcrum 23 and groove 36 can engage by having a portion of the fulcrum 23 received into the groove 36 so that the groove 36 can exert a generally upward force on the fulcrum 23, e.g., having a component in a radial direction relative to the pivot axis 46 along which the slots 21 receive the tabs 32 to keep the slots 21 and tabs 32 engaged with each other and a component to support the weight of the housing 2. This can allow a user to release the housing 2 during the engagement process, so the user can use one hand to press the housing 2 toward the mount 3 at the lower end and use another hand to engage the latch 33. In some examples, a hinge connection between the housing 2 and mount 3 (such as that provided by the tabs 32 and slots 21) can resist movement of the housing in directions parallel and perpendicular to the pivot axis 46 (e.g., lateral and horizontal movement) but is not configured to resist movement of the housing 2 away from the pivot axis 46 in a radial direction relative to the pivot axis 46. Thus, when the housing 2 and mount 3 are engaged by the hinge connection as shown in FIG. 4, the housing 2 can fall from the mount 3 in a radial direction away from the pivot axis 46 unless the user holds the housing 2 engaged with the mount 3. However, when the housing 2 is pivoted toward the mount 3 to a position close to that in FIG. 5 but before the latch 33 is engaged, the fulcrum 23 can engage the mount 3 and/or the magnet 37 can exert an attractive force on the housing 2 to hold the housing 2 in place relative to the mount 3 before the latch 33 is engaged. In some examples, the fulcrum 23 and/or magnet 37 together with the hinge connection (e.g., provided by the slots 21 and tabs 32) can support the housing 2 on the mount 3 before the latch 33 is engaged. That is, the fulcrum 23 and/or magnet 37 can exert an upward and/or radially directed force relative to the pivot axis 46 that keeps the tabs 32 and slots 32 engaged, and the hinge connection can provide a retaining force in a direction perpendicular to the radial direction (e.g., perpendicular to a direction in which the slots 21 receive the tabs 32 or a plane of the rear side of the housing 2) to keep the rear side of the housing 2 engaged with the mount 3 so the fulcrum 23 and/or magnet 37 can exert a supporting force on the housing 2.

In some examples, rather than provide a second pivot axis about which the housing 2 can move between the rest and activation positions, the housing 2 and mount 3 can be configured so that the housing 2 moves about the pivot axis 46 between the rest and activation positions. Thus, in some examples a hinge connection between the housing 2 and mount 3 (such as that provided by the tabs 32 and slots 21) can provide not only a convenient and effective way to secure the housing 2 to the mount 3, but also provide a connection that allows for movement of the housing 2 relative to the mount 3 to cause actuation of a switch 47 or other component that indicates activation of the doorbell. To urge the housing 2 to move to the rest position, a biasing element such as a spring or magnet can be provided to move the housing 2 away from the mount 3, at least at a lower end of the housing 2 or other location where a switch 47 is located. For example, a biasing element can be provided where the fulcrum 23 is located and the fulcrum 23 eliminated in some examples. In some examples, a biasing element can be incorporated into the switch 47, e.g., the switch 47 can include a spring that urges the housing 2 to move the rest position in the absence of a force on the housing 2 to move the housing to the activation position. The housing 2 can move pivotally about the pivot axis 46 between rest and activation positions, or the housing 2 and mount 3 can be configured to permit movement of the housing 2 along a linear path relative to the mount 3 between the rest and activation positions. Where the housing 2 is movable relative to the mount 3 between rest and activation positions, the hinge connection and latch engagement can be configured to permit the required movement of the housing 2 relative to the mount 3, while otherwise restricting or limiting movement of the housing 2, e.g., to prevent disengagement of the housing 2 from the mount 3. Such movement can be provided by suitably sizing or otherwise configuring the slots 21 and tabs 32 (or other hinge components) as well as the latch 33 and slots 22 (or other latch engagement components).

Note that the positioning and arrangement of features of the doorbell 1, such as hinge components, a biasing element, and/or second pivot point elements, can be configured in any suitable way. For example, the hinge tabs 32 can be located on the housing 2 and the hinge slots 21 located on the mount 3. Similarly, the fulcrum 23, groove 36 or other pivot point features can be positioned on the mount 3 or housing 2. Likewise, a biasing element 37 can be positioned on the housing 2 and/or mount 3 and in any suitable location.

As noted above, operation of the doorbell components can be controlled by the controller 45, which can include a programmed processor and/or other data processing device along with suitable software or other operating instructions, one or more memories (including non-transient storage media that can store software and/or other operating instructions), sensors, input/output interfaces (such as a user interface on the housing), communication modules, buses or other links, a display, switches, relays, triacs, a battery or other power source or supply, or other components necessary to perform desired input/output, control or other functions. A user interface can be arranged in any suitable way and include any suitable components to provide information to a user and/or receive information from a user, such as buttons, a touch screen, a voice command module (including a microphone to receive audio information from a user and suitable software to interpret the audio information as a voice command), a visual display, one or more indicator lights, a speaker, and so on.

While systems and methods have been described with reference to various illustrative examples, such systems and methods are not limited to the examples described. Thus, it is evident that many alternatives, modifications, and variations of the examples described will be apparent to those skilled in the art. Accordingly, examples as set forth herein are intended to be illustrative, not limiting.

The invention claimed is:

1. A doorbell comprising:
a mount to attach the doorbell on a surface; and
a housing separable from the mount and having a switch to operate the doorbell,
wherein the housing and the mount are configured to engage at corresponding first portions of the housing and the mount with the housing at a first position relative to the mount, and being pivotally movable relative to the mount from the first position to a second position at which the housing is secured to the mount, the housing being removably engaged by the corresponding first portions at the first position, and the housing being unremovable from the mount absent movement from the second position.

2. The doorbell of claim 1, wherein the corresponding first portions form a hinge having a pivot axis about which the housing is pivotable from the first position to the second position.

3. The doorbell of claim 2, wherein the corresponding first portions are configured to engage such that the housing is pivotable toward the mount about the pivot axis but is restricted in movement relative to the mount in directions parallel to the pivot axis and perpendicular to the pivot axis.

4. The doorbell of claim 2, wherein the mount and housing each have a first end and a second end opposite the first end, and the corresponding first portions are located at the first end of the mount and the first end of the housing.

5. The doorbell of claim 4, further comprising a latch configured to secure the housing to the mount at the second ends of the housing and the mount.

6. The doorbell of claim 5, wherein the latch is movable to engage the housing and mount at the second ends so as to restrict movement of the housing about the pivot axis and in directions parallel and perpendicular to the pivot axis.

7. The doorbell of claim 1, comprising a hinge to engage the housing and the mount at the corresponding first portions.

8. The doorbell of claim 7, wherein the hinge is configured to permit pivoting movement of the housing about a pivot axis between the first and second positions and to restrict movement of the housing in directions parallel and perpendicular to the pivot axis.

9. The doorbell of claim 8, wherein the hinge is located at a first end of the housing and the mount, the doorbell further comprising a latch configured to engage the housing with the mount.

10. The doorbell of claim 9, wherein the latch is located at a second end of the housing and mount that is opposite the first end.

11. The doorbell of claim 1, wherein the housing has a rear surface that is positioned away from the mount with the housing in the first position, and is positioned adjacent the mount with the housing in the second position.

12. The doorbell of claim 1, wherein the housing and the mount are configured such that the housing is pivotable about a first pivot axis from the first position to the second position and the housing is pivotable about a second pivot axis relative to the mount when the housing is in the second position.

13. The doorbell of claim 12, wherein the housing and mount are configured such that pivoting movement of the housing about the second pivot axis causes actuation of the switch.

14. A doorbell comprising:
a mount to attach the doorbell on a surface; and
a housing separable from the mount and having a switch to operate the doorbell,
wherein the housing and mount are configured to engage at corresponding first portions of the housing and the mount with the housing in a first position relative to the mount, and configured to permit pivotal movement of the housing relative to the mount from the first position to a second position at which the housing is secured to the mount,
wherein the corresponding first portions include a tab on the on the housing or the mount and a slot on the other of the housing or the mount to receive the tab, the tab and slot being configured to permit pivoting movement of the housing between the first and second positions.

15. A doorbell comprising:
a mount to attach the doorbell on a surface; and
a housing separable from the mount and having a front side, a rear side and a switch to operate the doorbell,
wherein the housing and mount are configured to engage at corresponding first portions of the housing and the mount with the housing in a first position relative to the mount, and configured to permit pivotal movement of the housing relative to the mount from the first position to a second position at which the housing is secured to the mount,
wherein the switch is contactable by the mount at the rear side of the housing with the housing in the second position, and wherein the front side of the housing is configured to be pressed by the user to cause the mount to contact the switch.

16. A method of assembling a doorbell comprising:
providing a mount attached to a surface and a housing separated from the mount and having a switch configured to be actuated to provide an indication of actuation of the doorbell;
engaging corresponding first portions of the mount and the housing, the housing being in a first position relative to the mount and being removable from the mount at the first position, the corresponding first portions defining a pivot axis;
pivoting the housing relative to the mount about the pivot axis from the first position to a second position; and
securing the housing to the mount at the second position such that the housing is unremovable from the mount absent movement from the second position.

17. The method of claim 16, wherein engaging corresponding first portions includes engaging hinge portions on the mount and housing with each other.

18. The method of claim 16, further comprising engaging a latch to secure the housing to the mount with the housing in the second position.

19. The method of claim 16, further comprising moving the housing relative to the mount to cause the mount to contact the switch on a rear surface of the housing to actuate the doorbell.

20. The method of claim 16, wherein a rear surface of the housing is positioned away from the mount with the housing in the first position, and the rear surface of the housing is positioned adjacent to the mount with the housing in the second position.

* * * * *